(12) United States Patent
Lee

(10) Patent No.: US 7,308,693 B2
(45) Date of Patent: Dec. 11, 2007

(54) DISK DRIVE STRUCTURE WITH AN ADJUSTABLE BEARING STRUCTURE FOR GUIDE BARS

(75) Inventor: Cheng-Fu Lee, Hsinchu (TW)

(73) Assignee: Lite-On It Corporation, Hsinchu (TW)

( * ) Notice: Subject to any disclaimer, the term of this patent is extended or adjusted under 35 U.S.C. 154(b) by 0 days.

(21) Appl. No.: 11/713,674

(22) Filed: Mar. 5, 2007

(65) Prior Publication Data

US 2007/0169137 A1    Jul. 19, 2007

Related U.S. Application Data

(62) Division of application No. 10/956,046, filed on Oct. 4, 2004, now Pat. No. 7,203,950.

(30) Foreign Application Priority Data

Aug. 3, 2004    (TW) ............................. 93123251 A

(51) Int. Cl.
    *G11B 7/08*    (2006.01)
    *G11B 7/085*   (2006.01)

(52) U.S. Cl. ................ 720/675; 720/672; 720/674; 192/138; 192/139; 192/148

(58) Field of Classification Search ............ 720/675, 720/672–674; 384/36; 403/52; 192/138, 192/139, 148
    See application file for complete search history.

(56) References Cited

U.S. PATENT DOCUMENTS

| 5,764,618 | A | 6/1998 | Kim |
| 5,995,478 | A | 11/1999 | Park |
| 6,044,057 | A | 3/2000 | Park et al. |
| 6,562,045 | B2 * | 5/2003 | Gil et al. ....................... 606/79 |
| 6,768,248 | B2 | 7/2004 | Chandler et al. |
| 7,127,730 | B2 | 10/2006 | Lu et al. |

* cited by examiner

*Primary Examiner*—Angel Castro
*Assistant Examiner*—Christopher R. Magee
(74) *Attorney, Agent, or Firm*—Ming Chow; Sinorica, LLC

(57) ABSTRACT

A disk drive structure with an adjustable bearing structure for guide bars therein. The disk drive includes a base, a spindle motor, a main guide bar located aside the spindle motor, a secondary guide bar located also aside the spindle motor but opposing to the main guide bar, an optical pickup head riding at the main guide bar and the secondary guide bar, and four bearing structures to sustain ends of the main guide bar and the secondary guide bar. The disk drive includes at least one of the four bearing structures is an adjustable bearing structure. The adjustable bearing structure includes a housing, a through hole, a spring arm, and a cam pillar pivotally mounted under the housing and sent into the through hole. By providing the cam pillar and the spring arm to hold the end of the respective guide bar, the position of the guide bar can be adjusted by turning the cam pillar.

6 Claims, 6 Drawing Sheets

DISK DRIVE STRUCTURE WITH AN ADJUSTABLE BEARING STRUCTURE FOR GUIDE BARS

CROSS REFERENCE

This application is a Divisional of application Ser. No. 10/956,046, filed on Oct. 4, 2004 now U.S. Pat. No. 7,203 950, which claims priority to Taiwan Patent Application No. 93123251, filed Aug. 3, 2004, the entire contents of which are hereby incorporated by reference.

BACKGROUND OF THE INVENTION

1. Field of the Invention

The invention relates to an optical disk drive structure, and more particularly to the interior structure of the disk drive having an adjustable bearing mechanism for guide bars that can be used to calibrate the position of the corresponding guide bar.

2. Description of the Prior Art

Referring to FIG. 1 and FIG. 2, a conventional disk drive with its housing removed is shown in a perspective view and a planar top view, respectively. As shown, a base 1, particularly the top surface 10 thereof, is used as a platform to mount major components of the disk drive. These major components include a spindle motor 11, an optical pickup head 12, and a pair of guide bars (a main guide bar 13 and a secondary guide bar 14) to carry the optical pickup head 12 and guide the optical pickup head 12 to move linearly back and forth with respect to the spindle motor 11.

The spindle motor 11 is used to bear and rotate a disk (not shown in the figures). The optical pickup head 12 is driven by a motor via a spiral bar or a gear set (not shown in the figures) to move linearly back and forth with respect to the spindle motor 11. Upon such an arrangement, the optical pickup head 12 can capture the data recorded on the disk sustained and rotated by the spindle motor 11. As shown, the optical pickup head 12 rides over the main guide bar 13 and the secondary guide bar 14, in which each end of either the main guide bar 1'3 or the secondary guide bar 14 is mounted on the top surface 10 of the base 1 by a bearing structure 15.

In the art, as long as the bearing structure 15 is fixed to the base 1, no further adjustment can then be applied to move even slightly its position on the top surface 10. It implies that the spacing between the main guide bar 13 and the secondary guide bar 14 is firmly fixed after all four bearing structures 15 are anchored in position.

Generally, while the optical pickup head 12 reads the disk on the spindle motor 11, most of reading errors are caused by the misalignment between the spindle motor 11 and the optical pickup head 12. As shown in FIG. 2, the foregoing misalignment can be evaluated by judging the difference between a spacing D1 and a spacing D2, in which the spacing D1 is the distance from a center of the spindle motor 11 to the main guide bar 13 and the D2 is the distance from a center of the optical pickup head 12 to the main guide bar 13. In the case that the D1 is equal to the D2, it implies that no misalignment between the spindle motor 11 and the optical pickup head 12 exists. Otherwise, an offset in alignment does definitely exist in between.

It is well known in manufacturing the disk drive that a minor offset misalignment between the spindle motor 11 and the optical pickup head 12 is inevitable. Yet, in the case that a major offset misalignment is, unfortunate to exist in between, a substantial bad influence will occur to worsen the reading precision of the optical pickup head 12. Sometimes, such an influence is directly related to the frequently reading failure in a disk drive. However, to correct the aforesaid misalignment simply by adjusting any of the bearing structures 15 that hold the main guide bar 13 and the secondary guide bar 14 is usually unpractical. Generally, massive disassembly and assembly of the disk drive may be required to correct the misalignment. Sadly, even though efforts may have been applied to correct the misalignment in the disk drive, yet it does not surely mean that the misalignment problem can be successfully corrected.

Therefore, an improvement that can satisfactorily correct the aforesaid misalignment between the spindle motor 11 and the optical pickup head 12 without involving too much disassembly/assembly work is definitely welcome to the skilled person in the art.

SUMMARY OF THE INVENTION

Accordingly, it is an object of the present invention to provide a disk drive structure with an adjustable bearing structure for guide bars, in which the adjustable bearing structure has a rotational cam pillar to contact with a bar end of the guide bar. For the cam pillar include a cam surface, the position of the bar end can be slightly adjusted by turning the cam pillar to vary the contact point between the bar end and the cam pillar. Thereby, any offset misalignment between the spindle motor and the optical pickup head carried by the guide bar can be compensated by adjusting the cam pillar of the adjustable bearing structure that hold the guide bar.

In accordance with the present invention, the disk drive structure with an adjustable bearing structure for guide bars comprises a base, a spindle motor, a guide bar for carrying an optical pickup head and guiding the optical pickup head to move linearly back and forth with respect to the spindle motor, and a bearing structure. The bearing structure is mounted on the base to hold respective bar end of the guide bar. The spindle motor mounted on the base to bear and rotate a disk. The disk drive structure of the present invention is characterized in that the bearing structure is an adjustable bearing structure.

The adjustable bearing structure of the present invention further comprises a housing, a through hole, a spring arm and a cam pillar.

The housing, located on the base to provide an accommodation space with the base for receiving a respective bar end of the main guide bar or the secondary guide bar, further includes a position stud extruding down toward the base.

The through hole of the base is located aside to the bar end received by the accommodation space of the housing.

The spring arm, mounted on the base and located aside to the bar end but opposing to the through hole, further includes a free end that can firmly and elastically press upon the bar end.

The cam pillar, rotationally mounted in the through hole, can further include a position surface, an adjusting surface and a pillar surface.

The position surface, located close to the housing, further includes a pivotal point as a rotation center of the cam pillar with respect to the housing. On the position surface, a plurality of position holes is also located for receiving the position stud of the housing. These position holes are arranged discretely on a circle whose center is the aforesaid rotation center. As long as the position stud mates with a particular position hole, a stop between the housing and the cam pillar is formed.

The adjusting surface, opposing to the position surface, further includes an adjusting port. By applying an adjusting means to pair with the adjusting port and thereby to rotate the cam pillar around the rotation center, the cam pillar can be rotated to have the position stub of the housing engage with one of the position holes so as to form the stop between the housing and the cam pillar.

The pillar surface, connecting the position surface and the adjusting surface, further includes a cam surface to contact with the bar end.

In the present invention, by mating the position stub with a particular one of the position holes to form a stop between the housing and the cam pillar and so as to have a particular point of the cam surface solid contact with the bar end, and also by providing the spring arm to form an elastic contact upon the bar end at the other side opposing to the cam pillar, the main guide bar or the secondary guide bar who has the bar end held be the adjustable bearing structure can be made adjustable.

In one embodiment of the present invention, the housing of the adjustable bearing structure can be a "]" shape structure with one end mounted on the base and another end extended freely to shield over the bar end.

In one embodiment of the present invention, the housing of the adjustable bearing structure can further includes a protruding cantilever arm, in which the cantilever arm has a free end that can position the position stud of the housing.

In one embodiment of the present invention, the adjusting port of the cam pillar can be a "+" shape cavity, and the adjusting means is a cross-head screw driver.

In one embodiment of the present invention, the cam pillar of the 10 adjustable bearing structure can penetrate through the through hole of the base.

In one embodiment of the present invention, the cam surface of the pillar surface is located between the position surface and the base; i.e. formed above the base.

All these objects are achieved by the disk drive structure with an adjustable bearing structure for guide bars described below.

BRIEF DESCRIPTION OF THE DRAWINGS

The present invention will now be specified with reference to its preferred embodiment illustrated in the drawings, in which.

DESCRIPTION OF THE PREFERRED EMBODIMENT

The invention disclosed herein is directed to a disk drive structure with an adjustable bearing structure for guide bars. In the following description, numerous details are set forth in order to provide a thorough understanding of the present invention. It will be appreciated by one skilled in the art that variations of these specific details are possible while still achieving the results of the present invention. In other instance, well-known components are not described in detail in order not to unnecessarily obscure the present invention.

In the following description, parts of the invention who serve the same purpose but have slight difference in configuration will be identically named and labeled.

Figure 1:
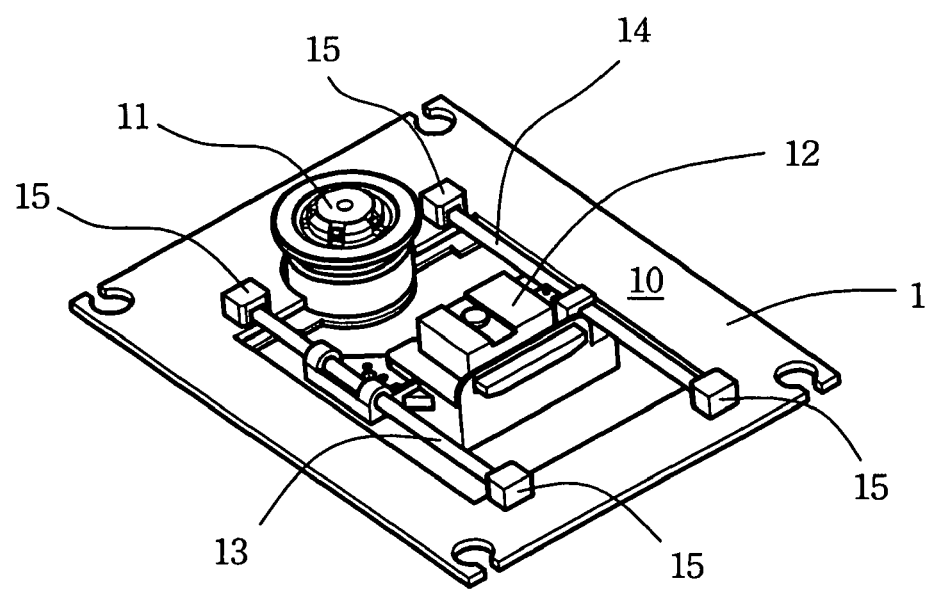
FIG. 1 is a perspective view of a conventional disk drive.
Figure 2:
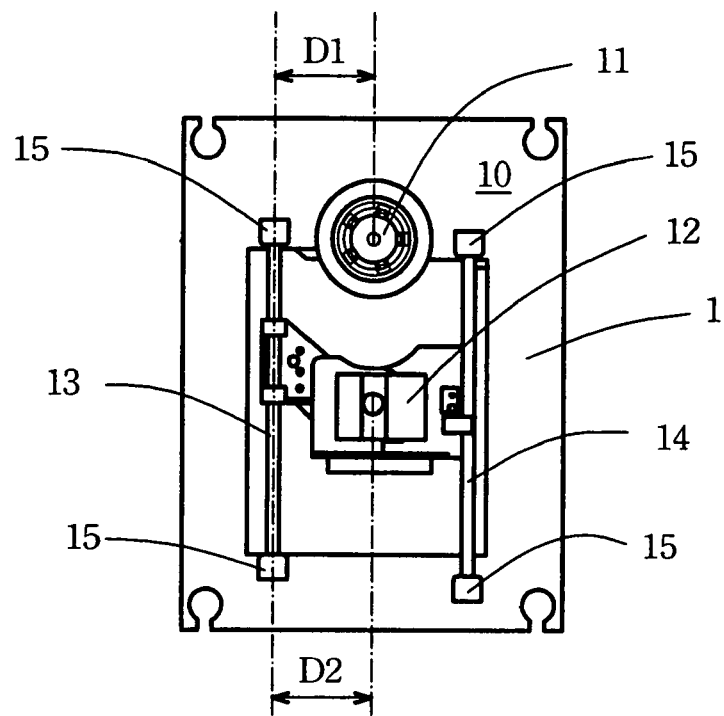
FIG. 2 is a planar top view of FIG. 1.
Figure 3:
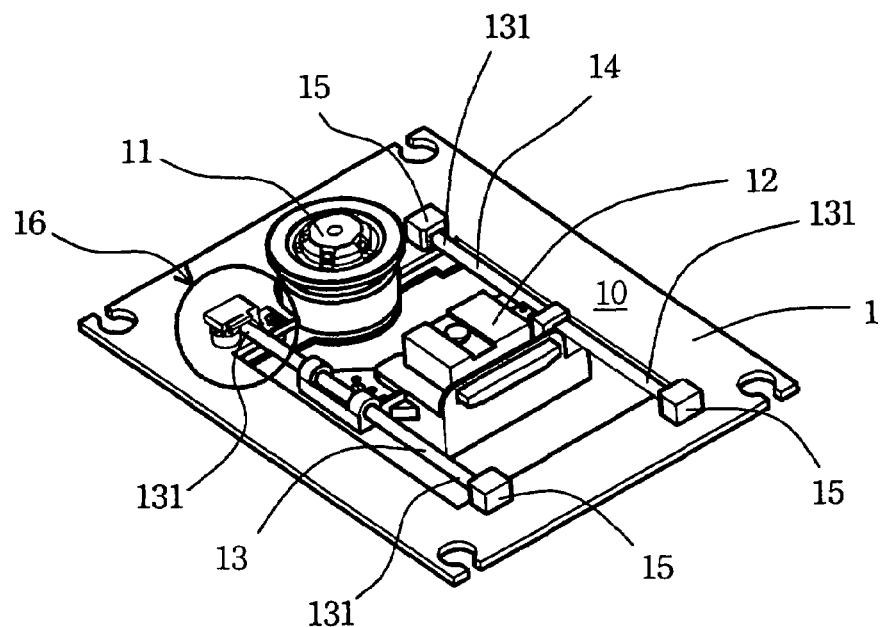
FIG. 3 is a perspective view of a preferred embodiment of the disk drive structure with an adjustable bearing structure for guide bars in accordance with the present invention.
Figure 4:
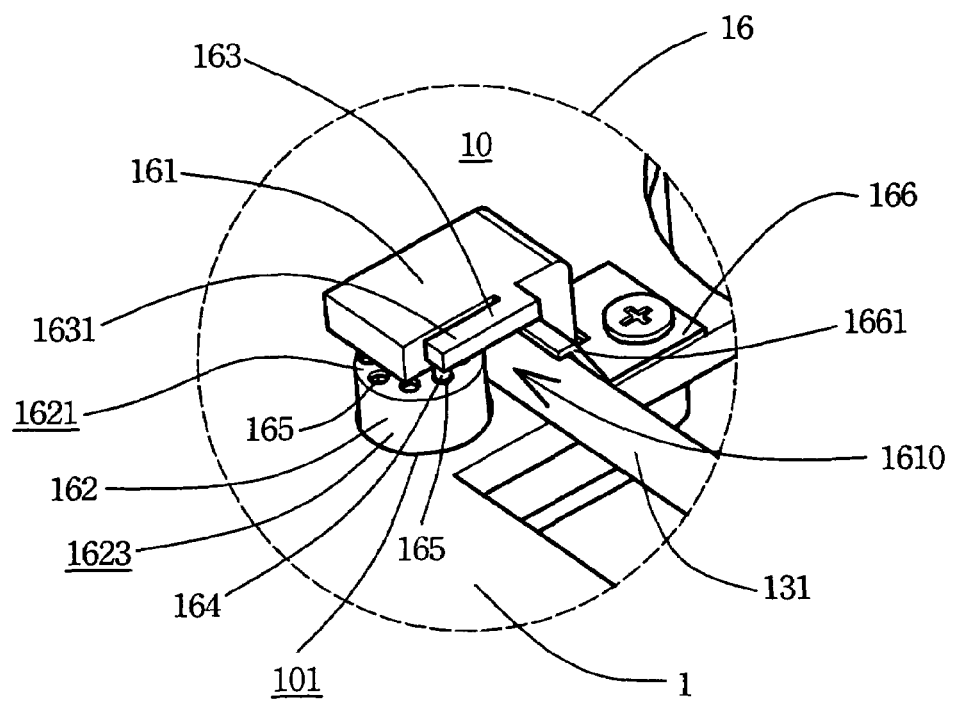
FIG. 4 is an enlarged view of FIG. 3 specified at the adjustable bearing structure.
Figure 5:
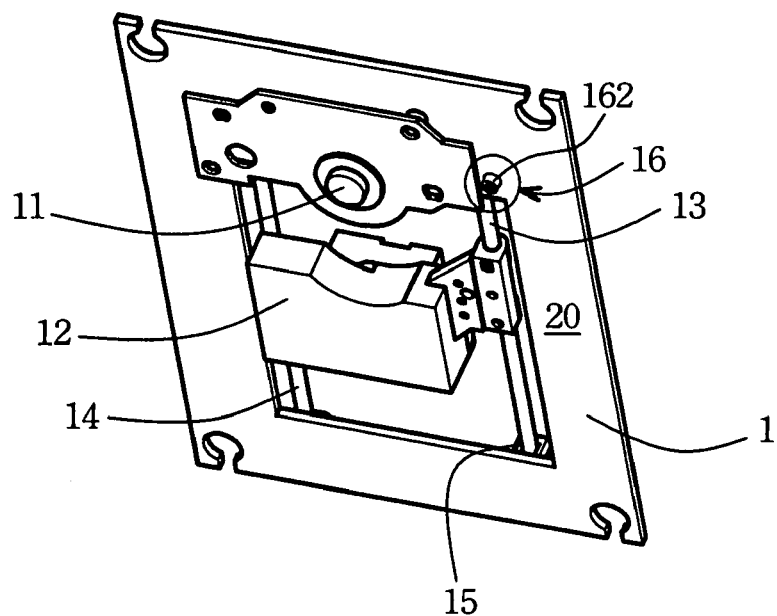
FIG. 5 is another perspective view of FIG. 3, viewing from a bottom side of FIG. 3.

Referring now to FIGS. 3, 4, 5 and 6, a preferred embodiment of the disk drive structure with an adjustable bearing structure for guide bars in accordance with the present invention, with the exterior casing removed, is shown in a perspective view from the top surface 10 of the base 1, an enlarged view of FIG. 3, another perspective view from the bottom surface 20 of the base 1, and an enlarged view of FIG. 5, respectively.

As shown, the disk drive structure with an adjustable bearing structure for guide bars of the present invention mainly comprises a base 1, a main guide bar 13, a secondary guide bar 14, four bearing structures 15 and 16, a spindle motor 11, and an optical pickup head 12. The secondary guide bar 14 is parallel to the main guide bar 13 at a predetermined spacing. The four bearing structures 15 and 16 are mounted separately on the top surface 10 of the base 1 to hold respective bar ends 131 of the main guide bar 13 and the secondary guide bar 14. The spindle motor 11 mounted on the base 1 is located between the main guide bar 13 and the secondary guide bar 14. The optical pickup head 12 rides over the main guide bar 13 and the secondary guide bar 14 so as to move linearly back and forth with respect to the spindle motor 11. According to the present invention, at least one of the four bearing structures 15 and 16 is an adjustable bearing structure 16 (one shown in this embodiment).

In this embodiment, one adjustable bearing structure 16 is shown to hold the bar end 131 of the main guide bar 13 that is close to the spindle motor 11.

The adjustable bearing structure 16 of the present invention further comprises a housing 161, a through hole 101, a spring arm 166 and a cam pillar 162.

As shown in FIG. 4, the housing 161, located on the base 1 to provide an accommodation space 1610 with the base 1 for receiving a respective bar end 131 of the main guide bar 13 or the secondary guide bar 14, further includes a position stud 164 extruding down toward the top 15 surface 10 of the base 1.

The through hole 101 of the base 1 is located aside to the bar end 131 that is received by the accommodation space 1610 of the housing 161.

The spring arm 166, mounted on the base 1 and located aside to the bar end 131 but opposing to where the through hole 101 is located with 20 respect to the bar end 131, further includes a free end 1661 that is extended to firmly and elastically press upon the bar end 131.

Figure 7:
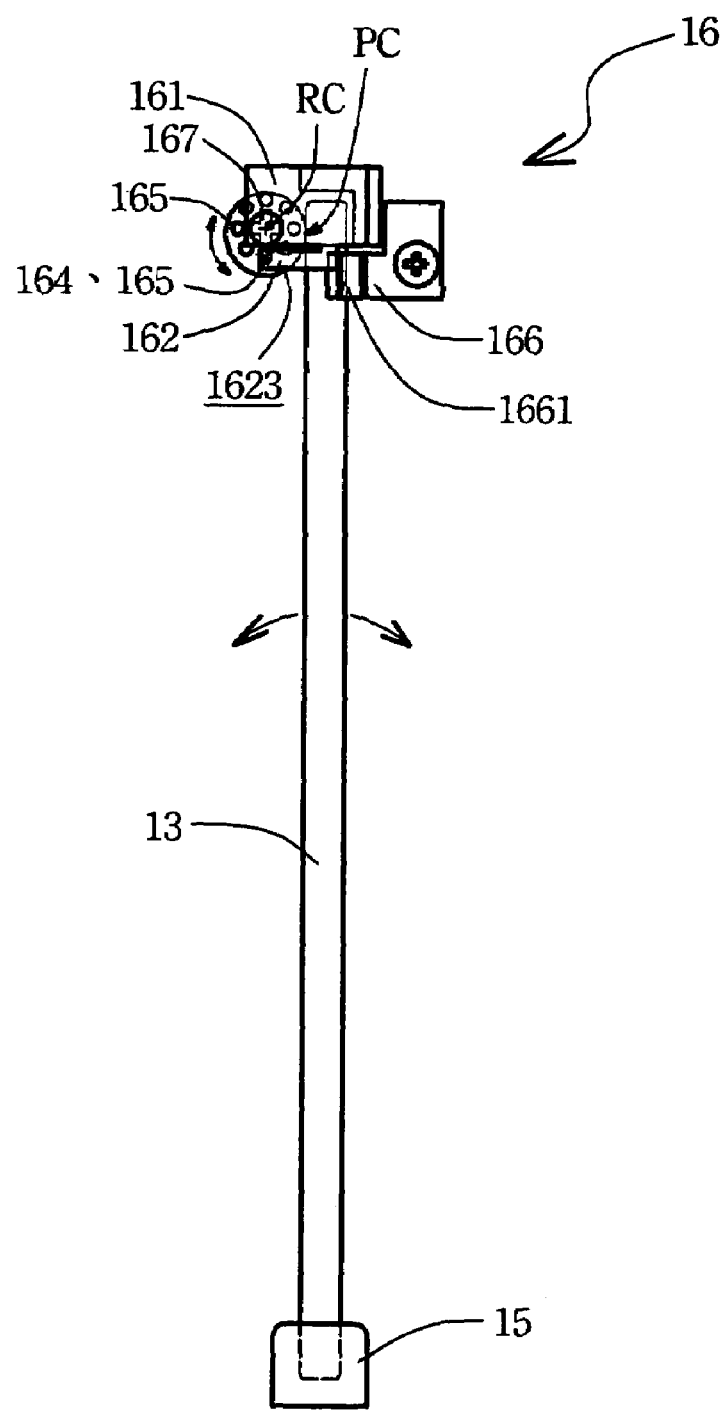
FIG. 7 is a planar top view of the cam pillar of FIG. 3.

Referring also to FIG. 7, the cam pillar 162, rotationally mounted under the housing 161 and in the through hole 101, can further include a position surface 1621, an adjusting surface 1622 and a pillar surface 1620.

The position surface 1621 of the cam pillar 162, located close to the housing 161, further includes a pivotal point as a rotation center RC of the cam pillar 162 with respect to the housing 161. On the position surface 1621, a plurality of position holes 165 is also located for receiving the position stud 164 extended downward from the housing 161. As shown in FIG. 7, these position holes 165 are arranged discretely on a circle of position CP whose center is also the aforesaid rotation center RC. By providing the position stud 164 to mate with a particular position hole 165, a stop can be formed to freeze the position relationship between the housing 161 and the cam pillar 162.

Figure 6:
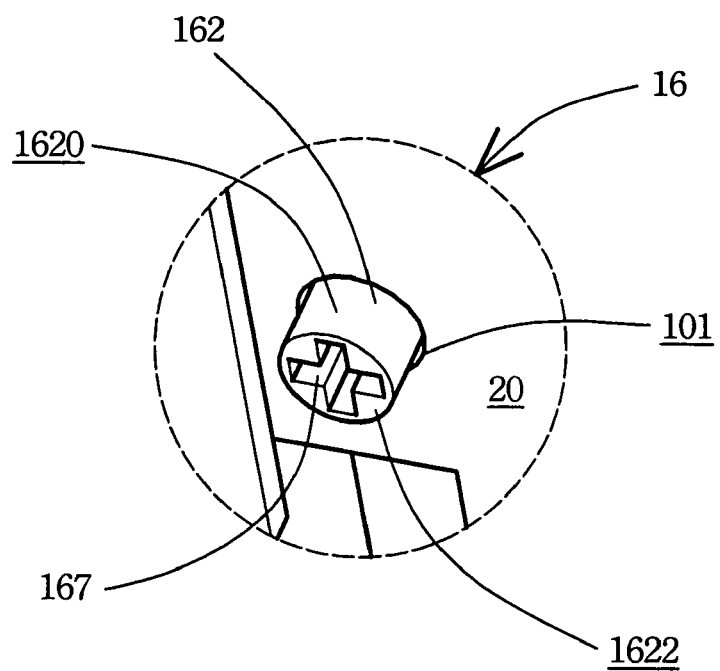
FIG. 6 is an enlarged view of FIG. 5 specified at the adjustable bearing structure.

Referring to FIG. 6, the adjusting surface 1622 of the cam pillar 162, located opposing to the position surface 1621 across the base 1, further includes an adjusting port 167. By applying an adjusting means (not shown in the figure) to pair with the adjusting port 167 and thereby to rotate the cam pillar 162 around the rotation center RC, the cam pillar 162 can be rotated to have the position stub 164 of the housing 161 engage with one of the position holes 165 on the position surface 1621 so as to form the stop between the housing 161 and the cam pillar 162.

The pillar surface 1620, being the lateral surface of the cam pillar 162 that connects the position surface 1621 and the adjusting surface 1622, further includes a cam surface 1623 to contact with the bar end 131. With respect to the rotation center RC, the cam surface 1623 is not a circle surface but a connected cam contour CC as shown in FIG. 7. In the present invention, the contact between the cam pillar 162 and the bar end 131 is happened to the cam surface 1623 of the pillar surface 1620.

Figure 8:
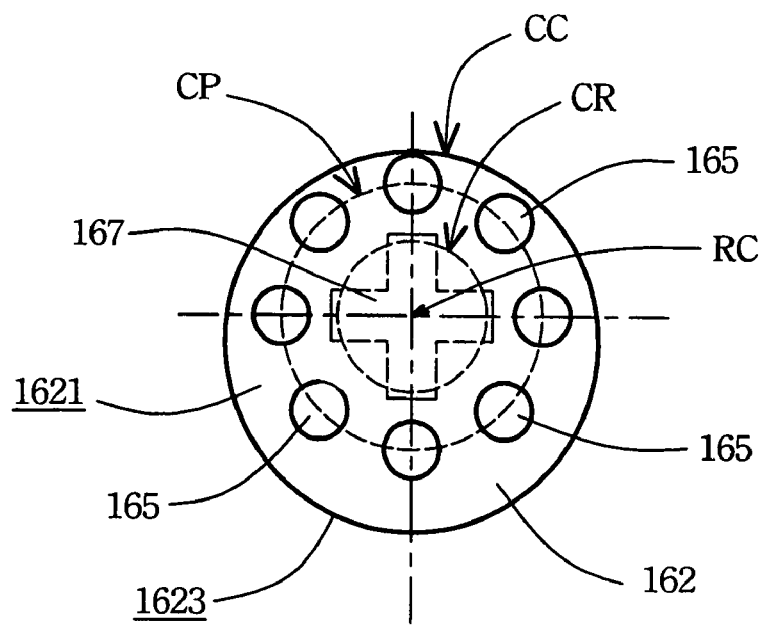
FIG. 8 is a planar top view of the main guide bar of FIG. 3.

Referring now to FIG. 8, a planar top view of the main guide bar 13 held by an adjustable bearing structure 16 at one bar end 131 and a conventional bearing structure 15 at another bar end 131 is shown. In the present invention, by mating the position stub 164 with a particular one of the position holes 165 to form a stop between the housing 161 and the cam pillar 162 and so as to have a particular point PC of the cam surface 1623 solid contact with the bar end 131, and also by providing the free end 1661 of the spring arm 166 to form an elastic contact upon the bar end 131 at the side opposing to the cam pillar 162, the main guide bar 13 can thus be adjustable.

In the present invention, the housing 161 of the adjustable bearing structure 16 can be a "⌐" shape structure as shown in the embodiment with one end mounted on the base 1 and another end extended freely to shield over the bar end 131. In other embodiments not shown here, the housing 161 can also be a "⊓" shape structure, a "⌐" shape structure, or any appropriate shape structure.

As shown in FIG. 4, the housing 161 of the adjustable bearing structure 16 can further includes a cantilever arm 163 extruding outward and sideward from a lateral side of the housing 161 that faces the main guide bar 13. The cantilever arm 163 has a free end 1631 pointing toward the cam pillar 162, in which the position stud 164 is constructed under the free end 1631. Upon such an arrangement, elasticity in motion during the position stud 164 sliding on the position surface 1621 between two neighboring position holes 165 can be obtained.

In the preferred embodiment of the present invention, the adjusting port 167 of the cam pillar 162 at the adjusting surface 1622 is a "+" shape cavity, and the adjusting means can be a cross-head screw driver. In other embodiments not shown here, the adjusting port 167 can be a "−" shape cavity, a hexagonal cavity, or any other appropriate shape of cavities. Definitely, with the change in shape of the adjusting port 167, the respective adjusting means should be varied accordingly as well.

In addition, in other embodiments of the present invention also not shown here, the adjusting port 167 can be a protruding part like a plate, a hexagonal stud, or any other appropriate shape of protrusions.

As shown in FIG. 5, the cam pillar 162 of the adjustable bearing structure 16 is sent through the through hole 101 of the base 1. In another embodiment of the present invention, the cam pillar 162 can also be half buried inside the through hole 101.

Figure 9:
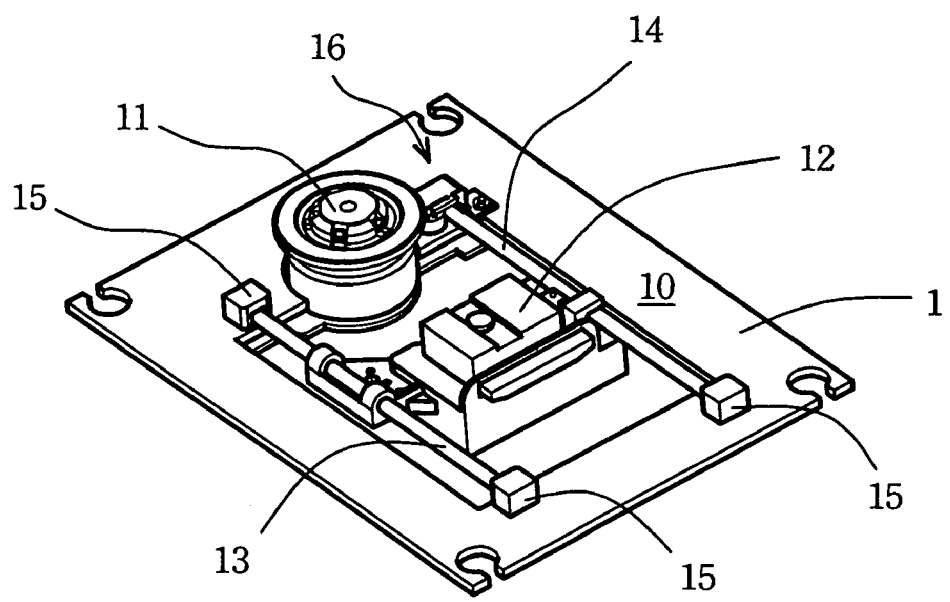
FIG. 9 is a perspective view of another embodiment of the disk drive structure with an adjustable bearing structure for guide bars in accordance with the present invention.

Referring now to FIG. 9, another embodiment of the disk drive structure with an adjustable bearing structure for guide bars is perspective shown. In this embodiment, the adjustable bearing structure 16 is constructed to hold the bar end 131 of the secondary guide bar 14 close to the spindle motor 11.

Figure 10:
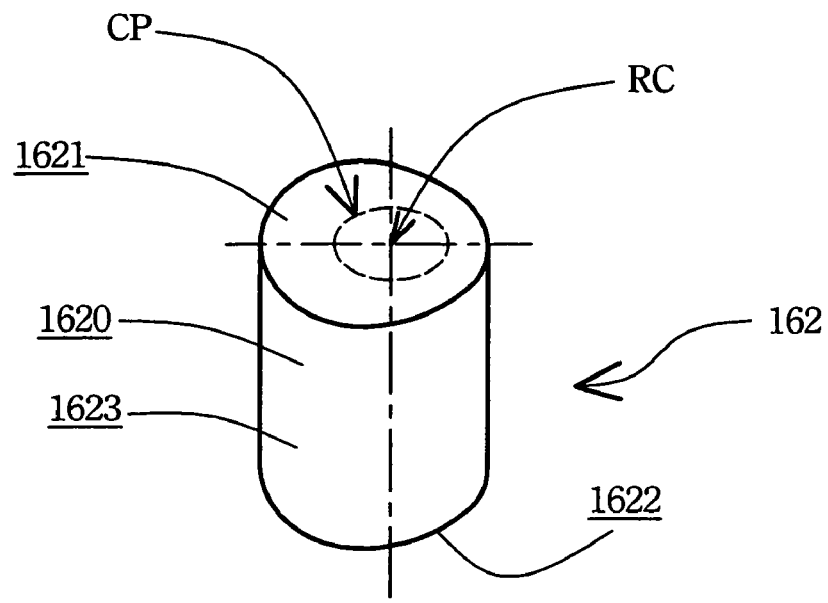
FIG. 10 is a schematic perspective view of a preferred embodiment of a raw cam pillar in accordance with the present invention.
Figure 11:
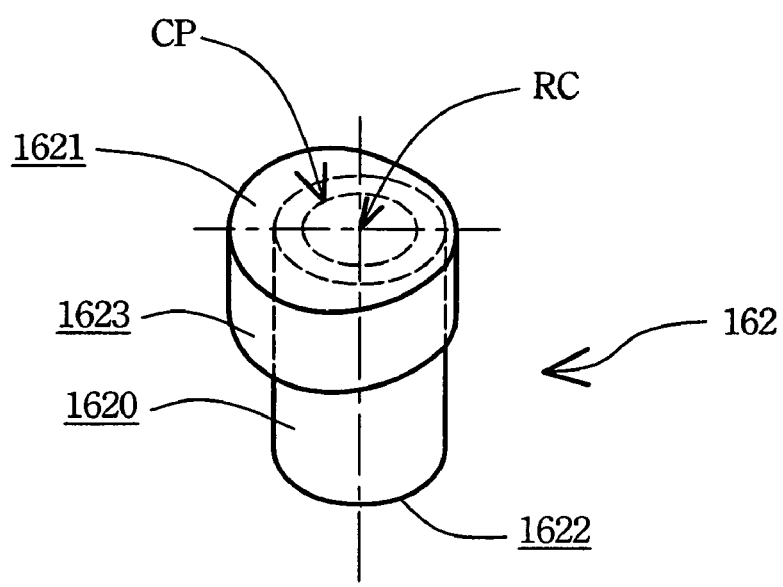
FIG. 11 is a schematic perspective view of another embodiment of the raw cam pillar in accordance with the present invention.

In the present invention, the pillar surface 1620 can be totally embodied as the cam surface 1623 as shown in FIG. 10. Or, as shown in FIG. 11, the cam surface 1623 can only be formed to the upper portion of the pillar surface 1620; i.e. the portion between the position surface 1621 and the base 1. Of course, with the change in shape of the cam pillar 162, the shape of the through hole 101 should be varied accordingly so as not to interfere the rotation of the cam pillar 162.

By providing the adjustable bearing structure of the present invention described above to hold the bar end of the main guide bar or the secondary guide bar, the offset misalignment problem between the spindle motor and the optical pickup head can be successfully corrected simply by turning the cam pillar of the adjustable bearing structure.

While the present invention has been particularly shown and described with reference to a preferred embodiment, it will be understood by those skilled in the art that various changes in form and detail may be without departing from the spirit and scope of the present invention.

I claim:

1. An adjustable bearing structure for holding one bar end of a guide bar, mounted on a base, comprising:
    a housing, forming an accommodation space with the base therebeneath for receiving the respective bar end, further including a position stud extruding downward;
    a through hole of the base, located aside to the bar end received by the accommodation space;
    a spring arm, mounted on the base, located aside to the bar end but opposing to the through hole, further including a free end pressing upon the bar end; and
    a cam pillar, rotationally mounted in the through hole, further including thereof:
    a position surface, close to the housing, further including a pivotal point as a rotation center of the cam pillar with respect to the housing;
    an adjusting surface, opposing to the position surface;
    a pillar surface, connecting the position surface and the adjusting surface, further including a cam surface to contact with the bar end;
    a plurality of position holes for receiving the position stud, located at the position surface by circling around the rotation center; and
    an adjusting port, located at the adjusting surface;
    wherein, by using an adjusting means to pair the adjusting port and thereby to rotate the cam pillar around the rotation center, the cam pillar is rotated to have the position stub engage with a particular one of the position holes so as to form a stop between the housing and the cam pillar.

2. The adjustable bearing structure according to claim 1, wherein said housing has a "⏋" shape with one end mounted on said base and another end extended freely to shield over said bar end.

3. The adjustable bearing structure according to claim 1, wherein said housing further includes a protruding cantilever arm, the cantilever arm
    having a free end with said position stud positioned therebeneath.

4. The adjustable bearing structure according to claim 1, wherein said adjusting port is a "+" shape cavity.

5. The adjustable bearing structure according to claim 1, wherein said cam pillar penetrates through said through hole.

6. The adjustable bearing structure according to claim 1, wherein said cam surface is located between said position surface and said base.

* * * * *